United States Patent
Eichelberger et al.

(10) Patent No.: US 10,254,104 B2
(45) Date of Patent: Apr. 9, 2019

(54) METHOD AND APPARATUS FOR CENTER HEIGHT ALIGNMENT OF A BORING BAR

(71) Applicant: Kennametal Inc., Latrobe, PA (US)

(72) Inventors: Samuel Eichelberger, Trafford, PA (US); Shi Chen, North Huntingdon, PA (US); Caleb Fisher, Latrobe, PA (US); Norm Dimatteo, Blairsville, PA (US)

(73) Assignee: KENNAMETAL INC, Latrobe, PA (US)

( * ) Notice: Subject to any disclaimer, the term of this patent is extended or adjusted under 35 U.S.C. 154(b) by 621 days.

(21) Appl. No.: 14/886,225

(22) Filed: Oct. 19, 2015

(65) Prior Publication Data

US 2017/0108327 A1 Apr. 20, 2017

(51) Int. Cl.
| | |
|---|---|
| *G01B 7/31* | (2006.01) |
| *B23B 29/02* | (2006.01) |
| *B23B 49/04* | (2006.01) |
| *B23B 25/06* | (2006.01) |

(52) U.S. Cl.
CPC .............. *G01B 7/31* (2013.01); *B23B 25/065* (2013.01); *B23B 29/02* (2013.01); *B23B 49/04* (2013.01); *B23B 2260/088* (2013.01); *B23B 2260/094* (2013.01); *B23B 2260/128* (2013.01); *B23B 2270/32* (2013.01)

(58) Field of Classification Search
CPC ........................................................ G01B 7/31
See application file for complete search history.

(56) References Cited

U.S. PATENT DOCUMENTS

| | | | | |
|---|---|---|---|---|
| 6,095,728 | A * | 8/2000 | Howie | B23Q 17/22 33/638 |
| 6,296,093 | B1 | 10/2001 | Norris et al. | |
| 6,443,673 | B1 | 9/2002 | Etling et al. | |
| 8,250,952 | B2 * | 8/2012 | Maxted | G05B 19/401 82/1.11 |
| 2002/0083805 | A1 | 7/2002 | Lundblad | |

FOREIGN PATENT DOCUMENTS

| | | |
|---|---|---|
| CN | 1840269 A | 10/2006 |
| CN | 103357908 A | 10/2013 |
| CN | 107030309 A | 8/2017 |

OTHER PUBLICATIONS

"Clay", "On Topic-Aligning boring tools on center on a slant bed lathe." Post 4, 2003, Narkive Newsgroup Archive of alt.machines. cnc, <http://alt.machines.cnc.narkive.com/Kt5wAxyx/on-topic-aligning-boring-tools-on-center-on-a-slant-bed-lathe#post4>.*

(Continued)

*Primary Examiner* — Jacob J Cigna
(74) *Attorney, Agent, or Firm* — Matthew S. Bedsole

(57) ABSTRACT

A method and apparatus for center height alignment of a boring bar is disclosed. The apparatus includes a seat member with a bottom and a back, and a digital angle gauge mounted to the seat member. The method includes the steps of: assembling an apparatus comprising a seat member and a digital angle gauge; calibrating the apparatus such that a Display of the digital angle gauge reads zero degrees; and aligning the center height of the boring bar by rotating the boring bar such that the Display of the digital angle gauge reads zero degrees when the apparatus is mounted onto the boring bar.

7 Claims, 5 Drawing Sheets

(56) References Cited

OTHER PUBLICATIONS

"Smarttools", "Magnetic Bracket", Aug. 29, 2015, <https://web.archive.org/web/20150829222348/http://smarttoollevels.com/accessories/>.*

"Smarttools", "SmartTool Gen-3 Owners Manual", 2014, <http://smarttoollevels.com/content/downloads/manuals/SmartTool-Gen3-Owners-Manual_ENG-ESP.pdf>.*

"Etp Transmissions", "Set up your boring bar in seconds using ETP HYDRO-FIX and our Digital Spirit Level", Mar. 2, 2016, <https://www.youtube.com/watch?v=ZnzDLAIEh1g>.*

"Smarttools", "SmartTool Gen-3 Owners Manual", 2014, <http://smarttoollevels.com/content/downloads/manuals/SmartTool-Gen3-Owners-Manual_ENG-ESP.pdf> (modified version for English text only).*

UC Riverside—Mechanical Engineering Department—Machine Shop Standard Operating Procedures for Manual Toolroom Lathes, 13 pages <http://www.me.ucr.edu/machineshop/UCR-ME-SOP-Manual-Lathes-v5.pdf> Ret. Aug. 10, 2018 (Year: 2011).*

* cited by examiner

METHOD AND APPARATUS FOR CENTER HEIGHT ALIGNMENT OF A BORING BAR

FIELD OF THE INVENTION

The present invention pertains to a boring bar for machining a workpiece. More particularly, the present invention relates to a method and apparatus for the center height alignment of a boring bar without the use of flats on the shank of the boring bar.

BACKGROUND OF THE INVENTION

Boring is the enlarging and truing of a hole by removing material from internal surfaces with a single-point cutter bit. On the lathe, boring is accomplished in either of these two methods: 1) mounting the holder and boring tool bar with cutter bit on the tool post and revolving the workpiece; or 2) mounting the workpiece in a fixed position to the carriage and revolving the boring tool bar and cutter bit in a chuck attached to the headstock spindle. (This is a special process and not used in most machine shops).

The workpiece may be supported in a chuck or fastened to a faceplate for boring operations depending upon the type of machine tool. When boring is to be performed on the ends of long stock needing additional support, the workpiece is mounted in a chuck and a steady rest is used to support farthest from the chuck. Some boring operations require the use of special chuck-mounted mandrels to hold workpieces that cannot be successfully mounted otherwise.

Boring is necessary in many cases to produce accurate holes. Drilled holes are seldom straight due to imperfections in the material which cause drills to move out of alignment. Therefore, where accuracy is important, drilled holes are usually made undersize and then bored or reamed to the proper dimensions.

A proper setup for boring requires that the correct boring tool is selected (not too long and not too small) and that the cutting insert mounted in the boring tool is set on center in the x-axis with the workpiece material.

Traditionally, boring bars are manufactured with one or multiple flats along the length of shank that are used to align the boring bar to the x-axis or on center to the workpiece. However, the addition of alignment flats reduces dynamic and static stiffness of the cutting tool. When the flats are used on long overhang tunable tooling, the reduction in stiffness greatly impacts the performance of the tool. If the flats are removed from the shank, such is often the case with tunable boring bars, the end user has no means to easily align the boring bar on center. The only possible way the end user can align the cutting tool on center is by scribing a line across the face of the workpiece with a cutting tool on the turret that is known to be calibrated on center, and then rotate the boring bar in the holder until the cutting edge is on center. However, this method can be cumbersome and the end user may not always have the option of scribing a permanent line on the face of the workpiece.

Therefore, it is desirable to provide a method and apparatus that provides center height alignment of the boring bar without the need to scribe a permanent line on the face of the workpiece or without the use of flats on the shank of the boring bar.

SUMMARY OF THE INVENTION

The problem of center height alignment of a boring bar without scribing lines on the workpiece or without using flats on the shank of the boring bar is solved by providing an apparatus comprising a digital angle gauge mounted on a seat member and a method of using the same.

In one aspect of the invention, a method comprises assembling an apparatus comprising a seat member and a digital angle gauge; calibrating the apparatus such that a display of the digital angle gauge reads zero degrees; and aligning a center height of the boring bar by rotating the boring bar such that the display of the digital angle gauge reads zero degrees when the apparatus is mounted onto the boring bar.

In another aspect of the invention, an apparatus for center height alignment of a boring bar comprises a seat member including a bottom and a back; and a digital angle gauge mounted to the seat member.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
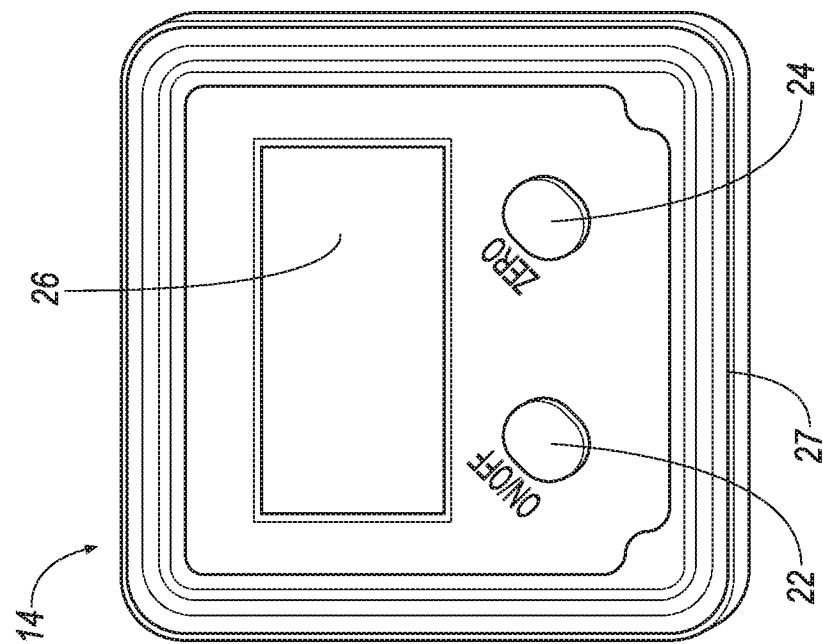
FIG. 1 is a front view of an apparatus for center height alignment of a boring bar according to an embodiment of the invention.
Figure 1:
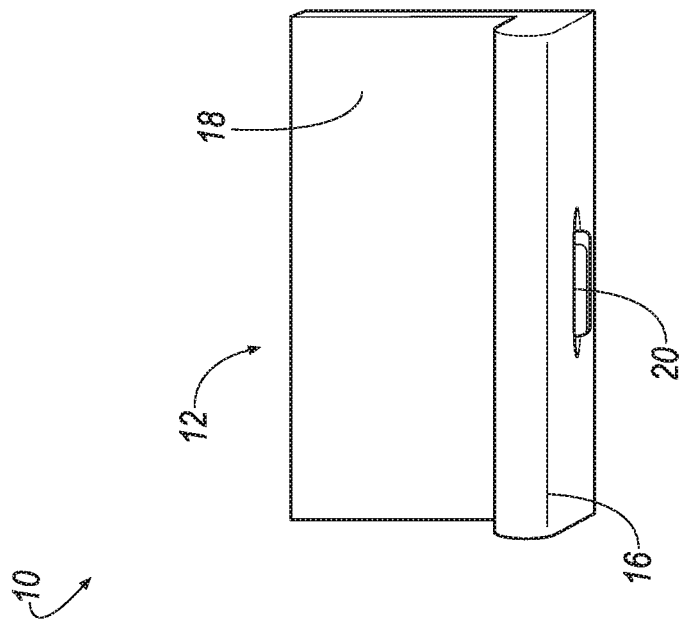

Referring now to FIG. 1, an apparatus 10 for center height alignment of a boring bar with a workpiece comprises two basic components: 1) a seat member 12, and 2) a digital angle gauge 14.

In one embodiment, the seat member 12 is made of a metallic material, such as tool steel, and the like. In the illustrated embodiment, the seat member 12 is substantially L-shaped in cross-section and includes a bottom 16 and a back 18. A magnet 20 is disposed in the bottom 16 of the seat member 12 to securely attach the seat member 12 to a metallic shank 34 of a boring bar 30 (FIG. 3), as described in more detail below.

The digital angle gauge 14 is of the type that is well-known in the art. For example, in the illustrated embodiment, the digital angle gauge 14 is commercially available from Wixey™ as Part No. WR300 Type 2. The digital angle gauge 14 includes an On/Off button 22, a Zero Button 24, a Display 26 and a magnet 27 disposed in the bottom of the digital angle gauge 14 to securely attach the digital angle gauge 14 to the seat member 12, which is made of metallic material.

The method of the invention comprises three basic steps: 1) assembly of the apparatus 10; 2) calibration of the apparatus 10; and 3) alignment of the center height of the boring bar 30.

Assembly of Apparatus

First, the user should clean the mounting surfaces of the digital angle gauge 14 and/or the corresponding surfaces of the seat member 12 to ensure to remove any dirt, chips, debris, and the like. Then, the apparatus 10 is assembled by mounting the digital angle gauge 14 onto the seat member 12 such that the magnet 27 of the digital angle gauge 14 is securely attached to the bottom 16 of the seat member 12. It is noted that the backside of the digital angle gauge 14 should be flush against the back 18 of the seat member 12 when the digital angle gauge 14 is properly mounted onto the seat member 12.

Calibration of Apparatus

Figure 2:
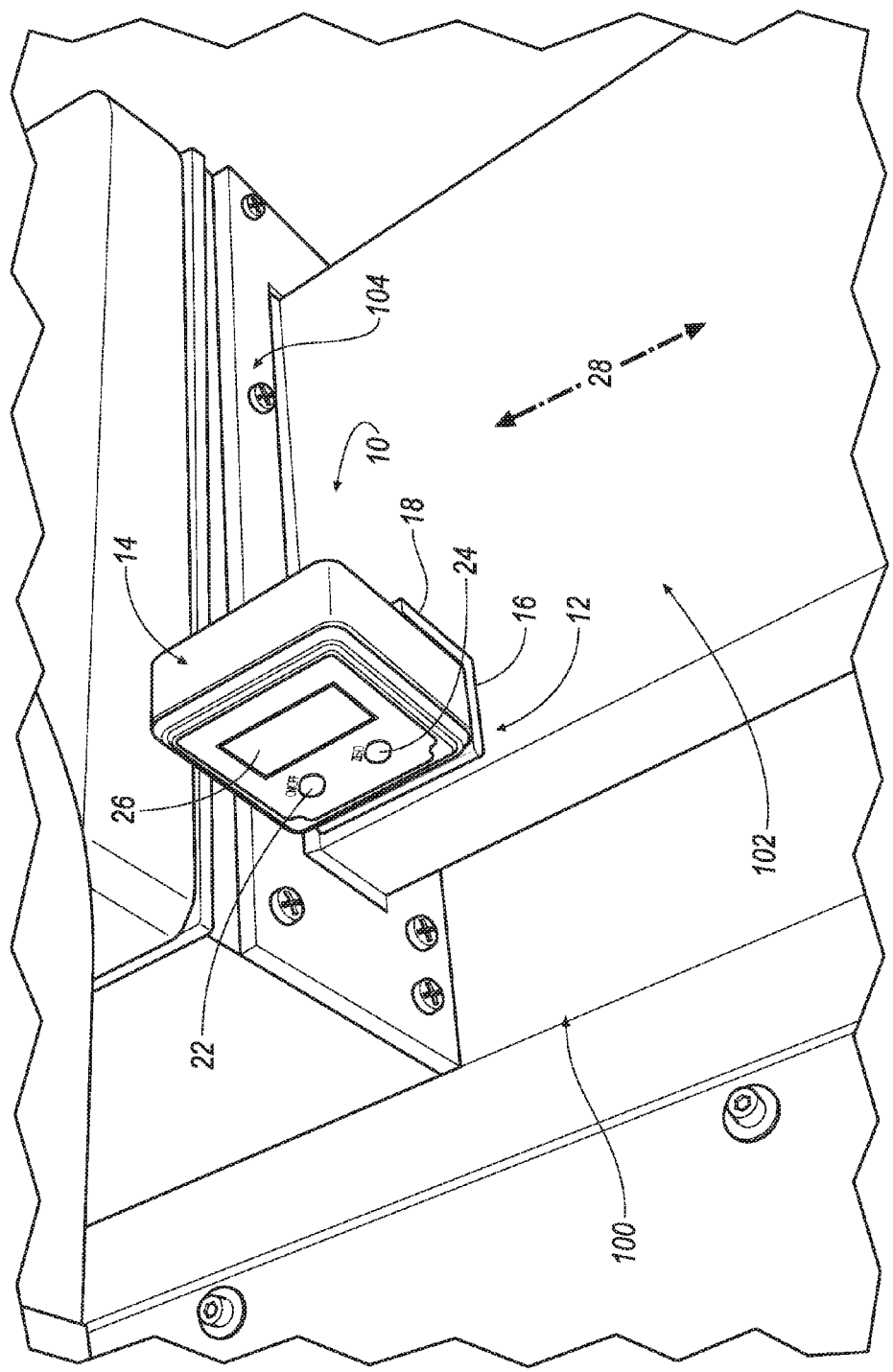
FIG. 2 is a partial view of the apparatus mounted on an X-axis way of a lathe in order to calibrate the apparatus according to a method of the invention.
Figure 4:
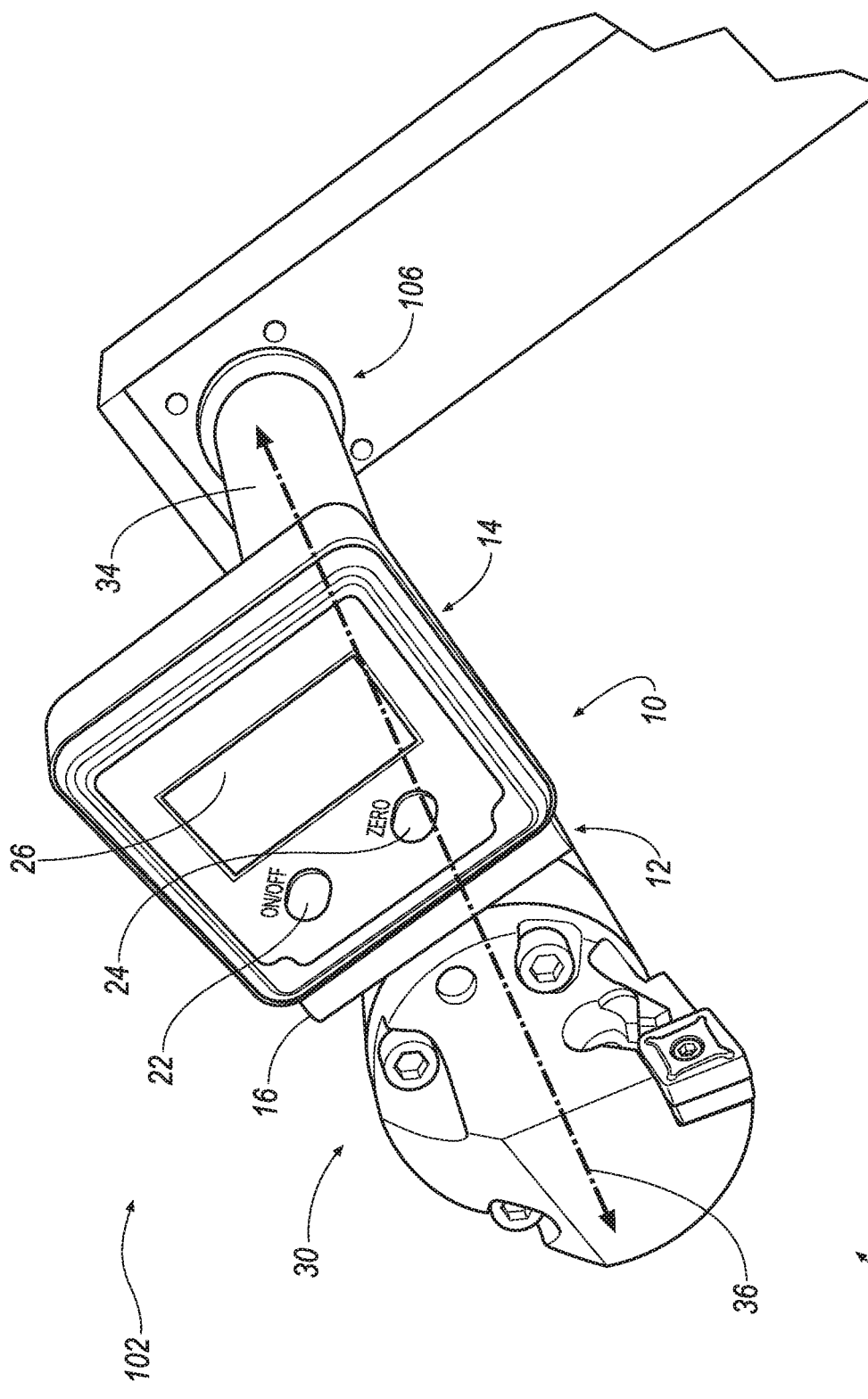
FIG. 4 is an end view of the apparatus mounted on the boring bar when the boring bar is mounted in the toolholder of the lathe in order to align the center height of the cutting insert mounted in the boring bar according to the method of the invention.

Next, the apparatus 10 is calibrated with respect to a reference surface of a toolholder 106 (FIG. 4). In the illustrated embodiment, the reference surface is an X-axis way 102 of a lathe 100. It is noted that the user should clean an area on the X-axis way 102 of the lathe 100 and the bottom 16 of the seat member 12 to remove any dirt, chips, debris, and the like. Then, the assembly apparatus 10 is mounted onto the X-axis way 102 of the lathe 100 such that the apparatus 10 is substantially parallel to an x-axis 28 of the X-axis way 102 of the lathe 100. It is noted that it may be helpful to butt the end of the apparatus 10 up against the turret housing 104 to help keep the apparatus 10 parallel to the x-axis 28, as shown in FIG. 2. Because the X-axis way 102 is made of metallic material, the magnet 20 disposed in the bottom 16 of the seat member 12 securely mounts the apparatus 10 to the X-way 102 of the lathe 100. Next, the digital angle gauge 14 is turned ON by pressing the ON/OFF button 22. Then, the digital angle gauge 14 is zeroed (i.e., calibrated to zero degrees) by pressing the Zero Button 24. At this point, the digital angle gauge 14 is calibrated to the X-axis way 102 (i.e., reference surface) of the lathe 100 and will measure relative angles corresponding to the X-axis way 102 of the lathe 100.

Alignment of Center Height of Boring Bar

Figure 3:
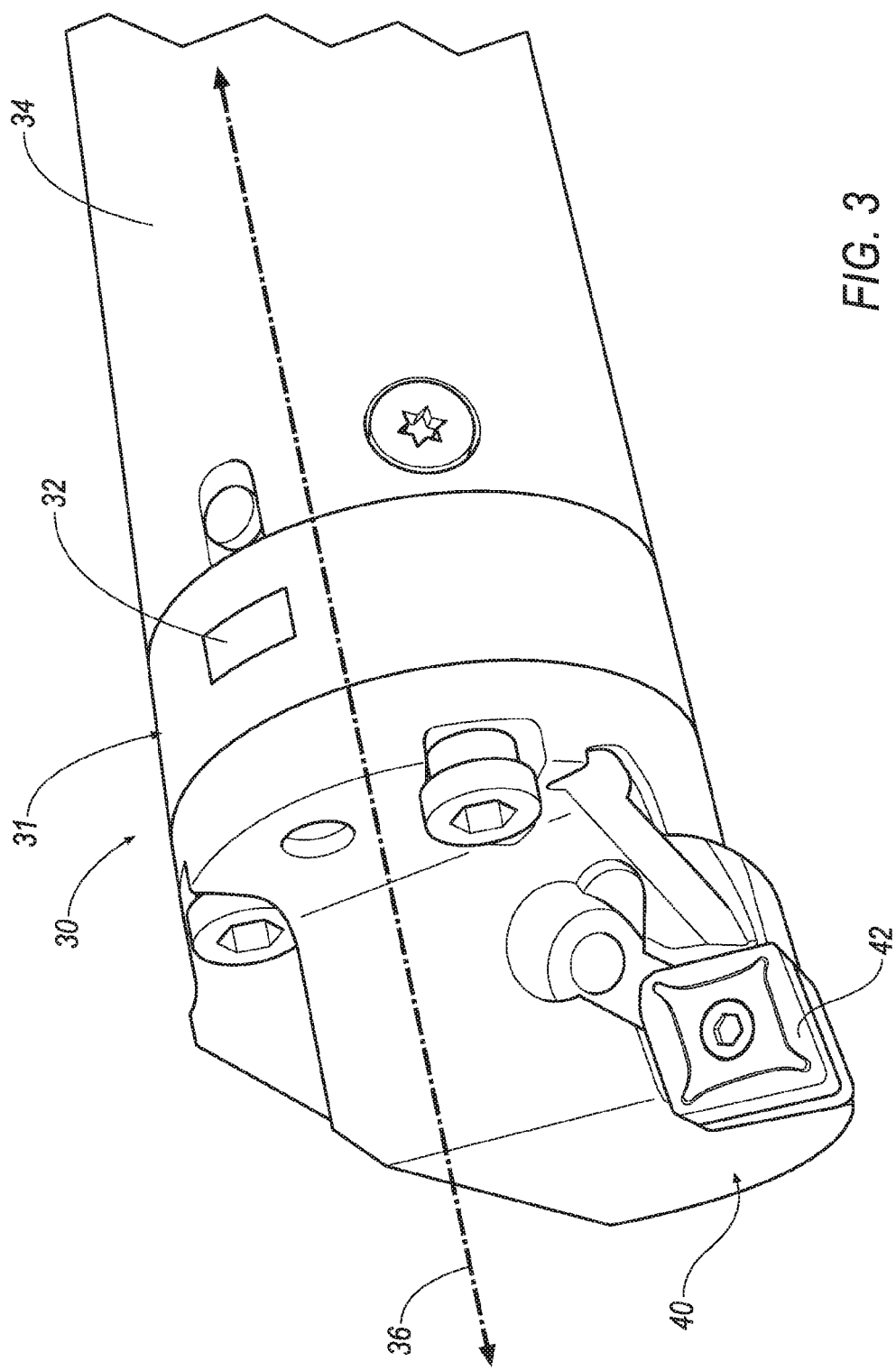
FIG. 3 is a partial side view of a boring bar when mounted in a toolholder of the lathe.

Referring now to FIGS. 3 and 4, the first step is to clean any dirt, chips, debris, etc. from the small flat 32 on the collar 31 of the boring bar 30 with the boring bar 30 already placed in the toolholder 106 and set to the correct overhang. It should be noted that there are two small flats 32 on the collar 31 that are 180° apart from each other. Thus, the second small flat 32 is not visible in FIGS. 3 and 4. The second small flat 32 (not shown) allows the boring bar 30 to be placed upside down for some applications. Next, the assembled apparatus 10 is mounted onto the boring bar 30 by aligning the magnet 20 on the bottom 16 of the apparatus 10 with the small flat 32 on the collar 31 of the boring bar 30. Because the boring bar 30 is made of metallic material, the magnet 20 disposed in the bottom 16 of the seat member 12 securely mounts the apparatus 10 to the small flat 32 on the collar 31 of the boring bar 30. It is noted that the user should be sure the apparatus 10 is perpendicular to the longitudinal axis 36 of the boring bar 30, and that the apparatus 10 is oriented in the same direction as when the apparatus 10 was calibrated to the X-axis way 102 of the lathe 100. That is, the apparatus 10 is mounted onto the boring bar 30 such that the apparatus 10 is oriented parallel to an x-axis 28 of the X-axis way 102 of the lathe 100.

Figure 5:
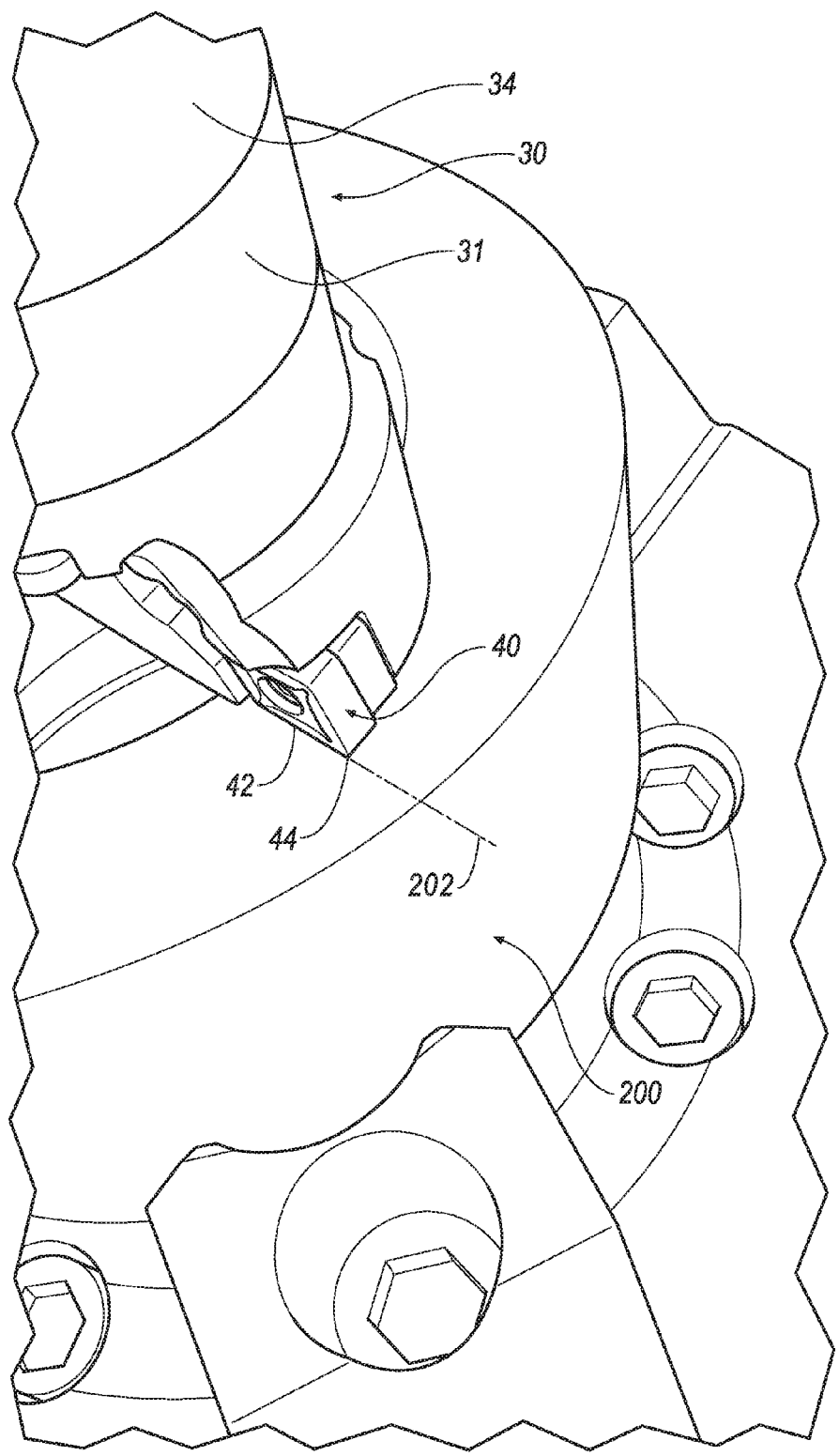
FIG. 5 is a partial side perspective view of the center height alignment of the boring bar with respect to a workpiece using the method of the invention.

Then, the boring bar 30 is rotated until the digital angle gauge 14 reads zero degrees in the Display 26. Next, the boring bar 30 is clamped in the toolholder 106 to lock the position of the boring bar 30. It is noted that the user should verify that the digital angle gauge 14 still reads zero degrees in the Display 26 after clamping the boring bar 30 in the toolholder 106. At this point, the cutting edge of the boring bar 30 is aligned on center. That is, a tip 44 of a cutting edge 42 of a cutting insert 40 mounted in the boring bar 30 is aligned with the plane 202 passing through the center of the workpiece 200, as shown in FIG. 5.

The patents and publications referred to herein are hereby incorporated by reference.

Having described presently preferred embodiments the invention may be otherwise embodied within the scope of the appended claims.

What is claimed is:

1. A method for center height alignment of a boring bar, comprising:
   assembling an apparatus comprising a seat member and a digital angle gauge; calibrating the apparatus such that a display of the digital angle gauge reads zero degrees; and
   aligning a center height of the boring bar by rotating the boring bar such that the display of the digital angle gauge reads zero degrees when the apparatus is mounted onto the boring bar,
   wherein the apparatus is calibrated to an X-axis way of a lathe,
   wherein the apparatus is mounted on a flat located on the boring bar, and
   wherein the method is carried out without the use of a flat on the shank of the boring bar.

2. The method according to claim 1, wherein the apparatus is mounted onto the boring bar such that the apparatus is oriented parallel to an x-axis of the X-axis way of the lathe.

3. The method according to claim 1, wherein the flat is located on a collar of the boring bar.

4. The method according to claim 1, wherein the apparatus is assembled by mounting the digital angle gauge onto the seat member.

5. The method according to claim 1, wherein the apparatus is mounted onto the boring bar such that the apparatus is oriented perpendicular to a longitudinal axis of the boring bar.

6. The method according to claim 1, further comprising clamping the boring bar in a toolholder of the lathe after the alignment step.

7. The method according to claim 6, further comprising verifying that the digital angle gauge reads zero degrees in the display after clamping the boring bar in the toolholder.

* * * * *